2,462,997

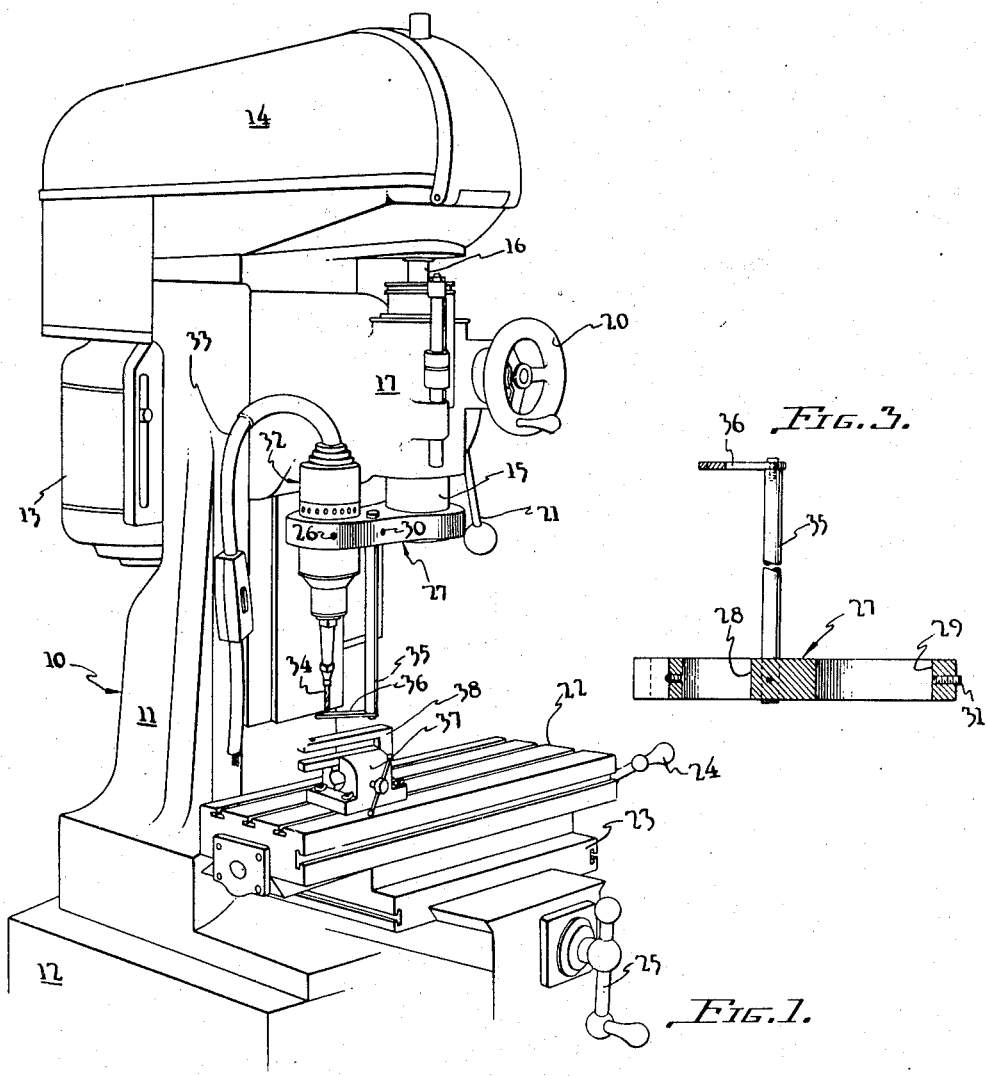
March 1, 1949.  J. L. ROUSH  2,462,997
ATTACHMENT FOR MILLING MACHINES
Filed Nov. 30, 1944
INVENTOR.
James Leigh Roush
BY Patented Mar. 1, 1949

UNITED STATES PATENT OFFICE 2,462,997

ATTACHMENT FOR MILLING MACHINES

James Leigh Roush, Oak Ridge, Tenn., assignor to the United States of America as represented by the United States Atomic Energy Commission Application November 30, 1944, Serial No. 566,011

3 Claims. (Cl. 90—11)

This invention relates to machine tool operations and is particularly concerned with means whereby a small precision power tool may be supported from the quill of a larger tool such as a vertical boring mill or milling machine so that the work which is to be tooled can be held on the table of the milling machine and worked on by the small power tool.

A primary object of my invention is the provision of means whereby a small high speed power tool can be supported from the quill of a vertical boring mill or the like so that the various adjustments of the table of the milling machine are available for spotting the work relative to the high speed tool which may be in the form of a drill or grinder. The ultimate objective to be achieved by my invention is making it possible to mill out narrow slots in a piece of material with a high degree of accuracy as to tolerances by utilizing the means which my invention provides. Various other types of precision work, of course, may be carried out with the arrangement which my invention provides.

Another object of the invention is to provide an adaptor member whereby a high speed power tool such as a drill or grinder can quickly and conveniently be attached to and supported from the quill of a vertical boring mill or milling machine so that the grinder can be used to operate on work held on the table of the milling machine.

Other objects of my invention and a number of its advantages will be apparent from the following detailed description and annexed drawing whereby Fig. 1 is a perspective view of a vertical boring mill having a high speed power tool supported from the quill of the machine by the device of my invention.

Fig. 2 is a plan view of the adaptor member of my invention.

Fig. 3 is a cross-sectional view taken along the line 3—3 of Fig. 2.

Referring to the drawing, numeral 10 indicates a vertical boring mill or milling machine which is a well known piece of equipment, and which in itself forms no part of my invention, equipment of this type having been in commercial use for a long period of time. The machine 10 includes an upright frame 11 having a base by which it is supported on a pedestal 12. At the upper part of the frame 11 and at the back thereof is an electric motor 13, suitably supported, which drives the milling or boring machine through a suitable drive mechanism which is within the housing 14 at the top of the machine, and this drive mechanism drives the spindle 16 of the machine which rotates within quill 15, which extends through the head 17 of the machine in the well-known manner characteristic of this type of equipment. The quill 15 is movable up and down by means of a hand wheel 20, and it may be set at any desired level or height by means of the handle 21. These characteristics are all well known in the art and common to this particular category of machine.

The milling machine has a table 22 having under-cut slots therein as shown for attaching work to the table and an intermediate table 23 which is similar in construction, but which is movable in a direction at right angles to the direction in which table 22 is movable. The table 22 is carried on the table 23 and is movable transversely thereto, that is, it is arranged so that it can be used as a feed operable from left to right by means of turning the crank 24 which operates to move the table 22 back and forth by means of a long screw-threaded stem in the usual manner characteristic of this type of equipment. The table 23 which as stated is of similar construction is movable in and out relative to the machine by means of crank 25 which operates by means of a corresponding mechanism, table 23 being mounted on the bed of the machine. By means of the adjustments just described, work held on the table 22 can be moved in any horizontal direction and therefore can be accurately spotted with reference to the quill 15. In some machines the head 17 may move up and down as well as the spindle and quill.

The particular device of my invention consists of an adaptor member whereby a high speed tool, such as an electrically driven power tool known in the art as a tool maker's grinder, can be supported from the quill 15 so as to operate on work which is held by and adjustable by the table 22 and the table 23. The adaptor member of my invention is designated by the numeral 27, and it is shown in detail in Figs. 2 and 3, the adaptor member consists of a flat plate having the shape shown in Fig. 2 and having two round holes therein as shown, indicated by the numerals 28 and 29. The hole 28 is of such a size that it snugly fits over the quill 15 so that when so fitted over the quill the adaptor member 27 is supported in a horizontal position. The adaptor member may be positively secured to the quill by means of a set screw 31 if desired. The hole 28 in the adaptor member 27 is of a size so that the tool previously referred to, that is, the high speed tool maker's grinder, indicated by the numeral 32 fits into the hole so as to be supported by the member 27. The tool may be secured by a set screw 26 if desired. The tool 32 comprises a housing containing an electric motor to which current is supplied through a cable 33, the tool having a chuck to which is attached a cutter, that is, a bit or grinder indicated by numeral 34.

The adaptor member 27 includes a downwardly extending rod 35 as shown on Fig. 1 which carries a transverse member 36 which forms a bearing for the lower end of the bit or cutter 34, and this bearing is known as an outboard bearing since the work being operated on is in a position between the bearing and the grinder. The rod may be secured by set screw 30.

Numeral 37 designates a small vise of conventional construction which is attached to the table 22 as shown and held in the vise is the work 38 which is to be operated on by the grinder. The particular piece of work shown in Fig. 1 consists of a U-shaped piece of carbon, which, as shown, has a small hole drilled in one of the legs, and the desired operation to be carried out is that of drilling a narrow accurate slit in the upper-most leg of U-shaped piece of work 38. This is done by adjusting the table 22 and intermediate table 23 so as to accurately spot the work 38 relative to the cutter 34 of the tool 32 and then adjusting the quill 15 downwardly so as to drill a hole in the end of the uppermost leg of the U-shaped member 38. As shown on Fig. 1 such a hole has already been drilled. After this hole is drilled, the bearing member 36 can be fitted to the end of the cutter 34 with the cutter extending through the hole in member 38. With the parts in this position and with the work 38 properly aligned, the desired slit can be accurately milled in the member 38 to the desired tolerances by feeding the table 22 to the left so as to cause the tool 38 to perform the desired milling operation. From the foregoing it can be observed that the work can be nicely set and thereafter adjusted or fed relative to the tool 32. The tool 32 is a high speed precision tool, and the device of my invention provides for very securely supporting and holding the tool while in operation. Since it is supported from the quill of the milling machine, the adjustments which the machine provides for the quill are available for moving the tool 32 up and down with accuracy and in increments of any desired size. The rotational speed of tool 32 is much higher than the speed of spindle 16 ordinarily would be in equipment of this type.

By using the adaptor member of my invention, grinding and milling operations can be accurately performed without any inconvenience and with a minimum of danger of spoiling the material being worked on. All of the various adjustments of the milling machine are effectively made use of.

The foregoing disclosure is representative of a preferred form of my invention, and it is intended that it be interpreted in an illustrative rather than a limiting sense, the scope of the invention to be determined in accordance with the claims appended hereto.

I claim:

1. As an article of manufacture, an adaptor unit for attaching a power tool to the quill or head of a milling machine or the like and supporting it therefrom comprising an elongated plate having two offset openings therethrough, one of a size to fit snugly over the quill of the milling machine and the other of a size to receive and support the body of a power tool in offset relation to the quill and over the table of the milling machine and means depending downwardly therefrom and forming part of the adaptor unit comprising a device forming an outboard bearing for the cutter of the power tool, said last means and said power tool being relatively adjustable to enable the bearing to be engaged with the cutter in a position such that the material being worked on is between the bearing and the tool.

2. In apparatus of the character described, in combination, means comprising a milling machine or the like having a spindle and quill or movable head forming part of the machine, said machine having means forming an adjustable table whereby work can be attached to the table and adjusted relative to the spindle, and means forming a supporting member whereby a relatively small high speed power tool can be attached to and supported from the quill or head in a position to engage work held on the table of the milling machine, said member comprising an elongated bracket having an opening therein adapted to fit over the quill of the milling machine and arranged to engage and support the high speed power tool in offset relation to the quill, and a cutter stabilizing member depending from said supporting member, said stabilizing member providing bearing means adjustable relative to said tool and adapted to stabilize the free end of said cutter when said free end extends beyond the work position.

3. An adaptor unit for supporting a high speed drill for forming grooves in work comprising a substantially flat elongated plate having a pair of offset openings therein, one of said openings being of a size to fit snugly over the quill of a milling machine, and the other of the openings being of a size to receive and support the body of a power drill in offset relation to the quill and over the table of a milling machine, whereby the drill may be easily raised and lowered in relation to any work positioned on the table without obstruction from parts of the milling machine.

JAMES LEIGH ROUSH.

REFERENCES CITED

The following references are of record in the file of this patent:

UNITED STATES PATENTS

| Number | Name | Date |
| --- | --- | --- |
| 741,141 | Kastien | Oct. 13, 1903 |
| 814,589 | Davis | Mar. 6, 1906 |
| 1,397,696 | Nelson | Nov. 22, 1921 |

FOREIGN PATENTS

| Number | Country | Date |
| --- | --- | --- |
| 361,720 | Germany | Nov. 9, 1922 |